May 14, 1935. A. NUTTELMAN 2,001,351
CORN HUSKER
Filed Nov. 28, 1933

Inventor
Arthur Nuttelman
By R. H. Bishop
Attorney

Patented May 14, 1935

2,001,351

UNITED STATES PATENT OFFICE 2,001,351

CORN HUSKER

Arthur Nuttelman, West Salem, Wis.

Application November 28, 1933, Serial No. 700,122

5 Claims. (Cl. 130—5)

This invention relates to agricultural implements and more particularly to a corn husker and one object of the invention is to provide an attachment which can be readily applied to a corn husker of conventional construction and serve to hold ears of corn in proper engagement with husking rollers as they pass along the rollers during a husking operation.

Another object of the invention is to so construct the device that a plate forming a portion thereof will be urged towards the rollers and apply sufficient pressure to hold the ears of corn in operative relation to the rollers and thereby insure thorough removal of the husks even in very dry weather.

Another object of the invention is to permit the plate to have yielding movement towards and away from the rollers and thereby not only apply the desired pressure to the ears of corn but also accommodate itself to ears which are somewhat larger or smaller than the general run of ears being passed through the husking machine.

Another object of the invention is to provide improved means for mounting the attachment and permitting adjustment of the plate in order to dispose it in determined normal spaced relation to the husking rollers of the husking machine.

Another object of the invention is to limit movement of the plate towards the rollers and thereby prevent direct contact of the plate with the rollers and permit ears of corn to easily pass from between the plate and rollers.

The invention is illustrated in the accompanying drawing wherein.

This improved attachment is for use upon a corn husker of conventional construction including the usual husking rollers 1 which extend longitudinally of the machine at a downward incline and are disposed in side by side relation to each other. Side walls 3 of the machine are located at opposite sides of the bank of rollers and from these walls extend downwardly converging plates 4 having their lower marginal portions in close proximity to the bank of rollers. Other portions of the machine have not been shown as they are of conventional construction and it is to be understood that when the machine is in operation ears of corn pass along the rollers from their upper ends towards their lower ends and the husks are caught between pairs of rollers and torn from the ears.

Figure 3:
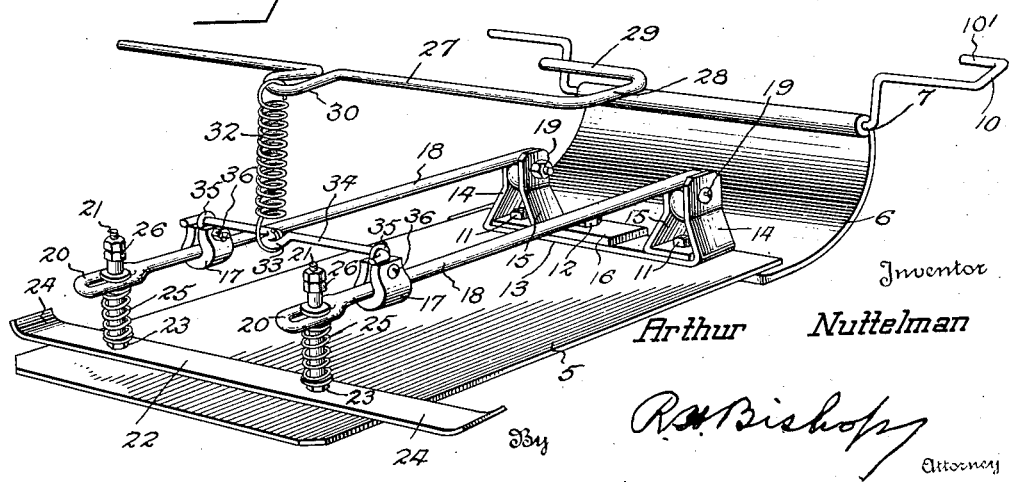
Fig. 3 is a perspective view of the attachment.

The attachment is constructed as shown in Fig. 3 and includes a plate 5 of flexible sheet metal which is preferably galvanized and of sufficient resiliency to normally remain flat. From the upper end of this plat extends a sheet metal lip 6 of greater thickness than the plate 5 and sufficiently thick to retain its shape. This upwardly curved lip constitutes a guide for directing ears of corn between the pressure plate 5 and the rollers and has its upper portion rolled about a rod 7 serving as a pivot. End portions of the rod project from opposite edges of the lip and are engaged through bearing brackets 8 which are secured to the plates 4 by bolts 9, and it should be noted that the said end portions, which are offset to form a crank shaft of the rod, engage through openings in the side walls 3, and one is bent to form a handle 10 whereby the shaft 7 may be turned to vertically adjust the pressure plate and be then secured in a set position by engaging the bill 10' through a selected opening formed in a wall 3.

Figure 2:
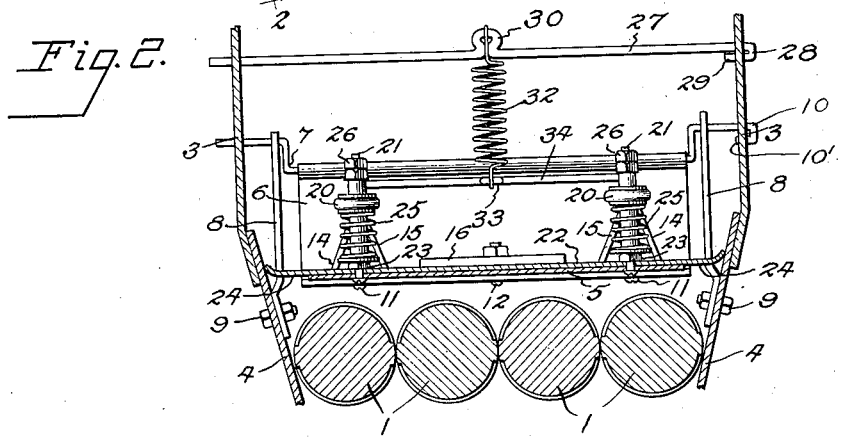
Fig. 2 is a transverse section taken along the line 2—2 of Fig. 1.

Since the plate 5 is formed separate from the lip 6 and must be secured thereto, there have been provided bolts 11 and 12 which pass upwardly through overlapped portions of the plate and lip and, in addition to securing the plate and lip to each other, also serve to hold a bracket 13 upon the plate. This bracket extends transversely of the plate at the upper end thereof and at its ends is provided with upstanding arms 14 and 15, the arms 15 being separate from the bracket when first formed and secured upon the bracket by the bolts 11. A metal block 16, constituting a weight, rests upon the bracket intermediate the arms 15 where it is secured by the bolt 12 and serves to impart downward movement to the plate. Other weights 17, which may be referred to as tension weights and are in the form of collars, are mounted upon rods 18 extending longitudinally of the plate 5, above the same and these rods have their upper ends pivotally mounted between the ears 14 and 15 of the bracket by bolts 19 while their lower ends are formed with eyes 20 through which extend stems 21. The stems are in the form of elongated bolts extending upwardly through the plate 5 and through a cross bar 22. Nuts 23 carried by the stems hold the cross bar firmly in place against the plate 5 and this bar is of such length that its end portions project from opposite side edges of the plate to form arms 24 which engage the plates 4 and limit downward movement of the pressure plate 5. Therefore, the pressure plate can not move closer to the rollers than shown in Fig. 2 and an ear of corn can easily pass from between the rollers and the pressure plate. Compression springs 25 yieldably retain the rods and plate in normal spaced relation to each other, and, in order to place these springs under proper tension, there have been provided nuts 26 carried by the upper ends of the stems.

Figure 1:
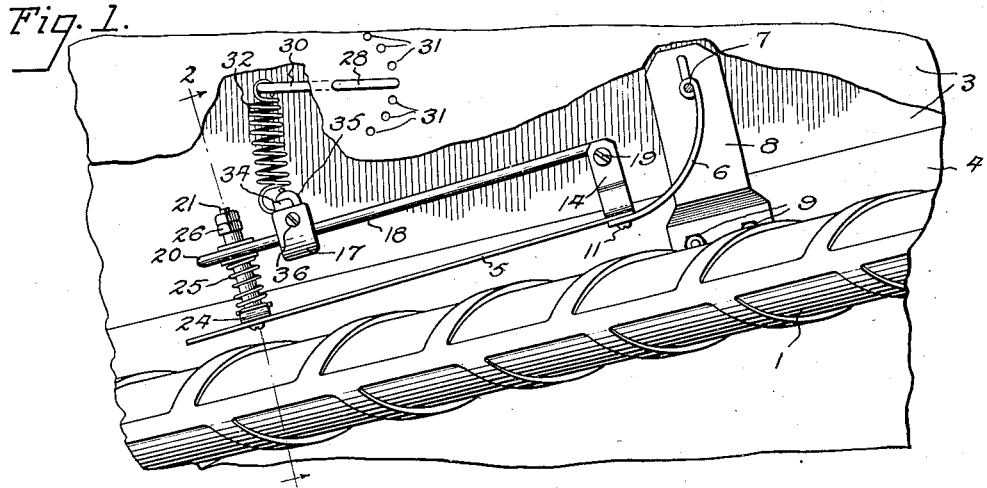
Fig. 1 is a view in side elevation showing the improved attachment mounted in operative relation to rollers of a corn husker.

In order to support the pressure plate and control the swinging movement thereof with the pivot 7 as its fulcrum, there has been provided a shaft 27 extending transversely of the plate above the rods 18. This shaft is journaled through openings formed in the side walls 3 of the husking machine and has one end portion bent to form a handle 28 and finger 29, and by referring to Figs. 1 and 2 it will be seen that by grasping the handle the shaft can be shifted longitudinally, then turned to swing its arm 30 vertically, and again shifted longitudinally to its original position in which the finger engages through one of the series of openings 31 and secures the shaft against rotation with the arm in a set position. An expansion spring 32 has one end engaged with the arm 30 and its other end engaged with the arm 33 of a rod or yoke 34 extending transversely of the rods 18 with its ends engaged through eyes 35 which in their turn are fastened to the weights 17 by bolts 36, said spring constituting a yielding connection between the shaft 27 and the rods 18. By turning the shaft to swing the arm 30 to an adjusted position and again securing the shaft, the tension of the spring 32 can be regulated and movement of the plate 5, relative to the rollers, controlled and also the plate caused to be supported in desired initial spaced relation to the rollers.

When this device is in use it is mounted as shown and may extend the full length of the bank of rollers or for only a portion of the length thereof. The ears of corn move along the rollers from the upper ends toward the lower ends thereof and as they engage the curved lip 6 they will be guided between the rollers and plate 5. Shafts 7 and 27 are adjusted to set the plate 5 the proper distance above the rollers to accommodate ears of the average size to be husked but as the lip is pivotally mounted at its upper end and the pressure plate is supported by the spring 32 the plate may accommodate itself to ears which are larger or smaller than the average. As the ears pass along the rollers under the pressure plate, pressure exerted by the springs 25 will cause the plate to hold the ears firmly against the rollers and as the rollers rotate husks will be caught between the rollers and torn from the ears. Therefore, a very efficient husking operation will take place even in very dry weather. The fact that the plate 5 is flexible and the springs 25 are spaced from each other transversely thereof permits the plate to have sufficient give to apply pressure to all ears passing under it even if the ears are not all of the same size. The weights cause the device to normally remain in the position shown in Fig. 1 and the tongues 24 limit movement of the plate towards the rollers.

Having thus described the invention, what is claimed is.

1. In a corn husker, a bank of husking rollers, a flat plate of relatively flexible material over said rollers, a lip of stiff material extending from one end of said plate and curved upwardly, means engaged with the upper edge of the lip for pivotally supporting and vertically adjusting the same, and means for yieldably supporting the lower end portion of said plate a predetermined distance above said rollers, and means to yieldably resist movement of the plate away from said rollers.

2. In a corn husker, husking rollers, a flexible plate over said rollers, a lip at one end of said plate to guide ears of corn between the plate and rollers, rods extending longitudinally of said plate above the same, a shaft extending transversely of said plate above said rods, said shaft having an arm intermediate its length and being rotatably mounted, a spring depending from said arm, a yoke at the lower end of said spring connected with said rods to support the plate, means to releasably secure the shaft against rotation and cause the spring to be tensioned and the plate to be supported in determined spaced relation to said rollers, and springs between the rods and plate yieldably resisting movement of said plate away from said rollers.

3. In a corn husker, a bank of husking rollers, a flexible plate over said rollers having a stiff lip at its upper end, the lip being curved upwardly away from said plate and pivotally mounted at its upper end, brackets rising from said plate adjacent the upper end thereof, rods pivoted to said brackets and extending longitudinally of the plate, compression springs between the plate and free ends of said rods, a cross bar, weights upon said rods engaged by ends of said cross bar, an adjusting shaft extending transversely of said plate over said rods and rotatably mounted, arms extending radially from the adjusting shaft and cross bar, and an expansion spring connected at its ends to said arms and constituting a yieldable connection between the adjusting shaft and cross bar.

4. In a corn husker, a bank of husking rollers, a flexible plate over said rollers extending longitudinally thereof and having an upwardly curved lip at one end pivotally mounted at its upper end, a shaft extending transversely of said rollers and rotatably mounted above said plate, said shaft having an arm intermediate its length and having means at one end for releasably securing the shaft against rotation, brackets rising from said plate adjacent the curved lip, rods extending longitudinally of said plate and pivoted at one end to said brackets, the other ends of said rods being provided with eyes, tongues projecting from said plate at sides thereof to limit movement of the plate towards said rollers, stems rising from said plate and engaged through said eyes, compression springs about said stems between the eyes and plate and yieldably resisting movement of the plate away from said rollers, collars upon said rods adjacent their eyes constituting weights, a cross bar connecting said collars, and an expansion spring connecting the arm of said shaft with said cross bar and having its tension controlled by rotation of said shaft to an adjusted position.

5. In a corn husker, husking rollers, a flexible plate pivoted at one end above the rollers and extending longitudinally thereof, rods pivoted at one end above the upper end portion of the plate and extending longitudinally thereof, bolts fixed in and rising from the plate near the free end thereof and passing vertically through the free ends of the rods, means to retain the bolts in the rods, a yieldable support for the free ends of the rods, and springs retained by the bolts between the rods and the plate to yieldably resist movement of the plate from the rollers.

ARTHUR NUTTELMAN.